US012129214B1

(12) United States Patent
Kumpon et al.

(10) Patent No.: US 12,129,214 B1
(45) Date of Patent: *Oct. 29, 2024

(54) RECYCLED GLASS POZZOLAN FOR CONCRETE

(71) Applicant: KLAW Industries LLC, Binghamton, NY (US)

(72) Inventors: Jacob Robert Kumpon, Binghamton, NY (US); Tanner Lee Wallis, Binghamton, NY (US); Jack Paulin Lamuraglia, Binghamton, NY (US)

(73) Assignee: KLAW Industries LLC, Binghamton, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,754

(22) Filed: Sep. 7, 2023

Related U.S. Application Data

(63) Continuation of application No. 17/222,244, filed on Apr. 5, 2021, now Pat. No. 11,760,690.

(60) Provisional application No. 63/053,638, filed on Jul. 19, 2020.

(51) Int. Cl.
| | |
|---|---|
| *C04B 7/12* | (2006.01) |
| *B03B 9/06* | (2006.01) |
| *B03C 1/22* | (2006.01) |
| *B03C 1/23* | (2006.01) |
| *B03C 1/30* | (2006.01) |
| *B09B 3/35* | (2022.01) |
| *B09B 101/50* | (2022.01) |
| *C04B 7/36* | (2006.01) |

(52) U.S. Cl.
CPC ............... *C04B 7/12* (2013.01); *B03B 9/06* (2013.01); *B03C 1/22* (2013.01); *B03C 1/23* (2013.01); *B03C 1/30* (2013.01); *B09B 3/35* (2022.01); *C04B 7/362* (2013.01); *B03C 2201/20* (2013.01); *B09B 2101/50* (2022.01)

(58) Field of Classification Search
CPC .. C04B 7/12; C04B 7/362; B03B 9/06; B03C 1/22; B03C 1/23; B03C 1/30; B03C 2201/20; B09B 3/35; B09B 2101/50
See application file for complete search history.

(56) References Cited

U.S. PATENT DOCUMENTS

| | | | |
|---|---|---|---|
| 4,014,431 | A | 3/1977 | Angeletti et al. |
| 4,997,485 | A | 3/1991 | Lamoni |
| 5,810,921 | A | 9/1998 | Baxter et al. |
| 6,344,081 | B1 | 2/2002 | Pelot et al. |

(Continued)

*Primary Examiner* — Michael Collins
*Assistant Examiner* — Miraj T. Patel
(74) *Attorney, Agent, or Firm* — Woods Oviatt Gilman LLP; Dennis B. Danella, Esq.

(57) ABSTRACT

An apparatus for producing pozzolanic material from waste includes a glass separator unit to remove glass material from the waste and a size reduction unit downstream the glass separator unit. The glass separator unit includes an outer member and a wound member positioned within the outer member and defining an open central bore. The outer member and the open central bore define respective longitudinal axes extending on a common plane that are disposed at an angle relative to a horizontal reference plane, with the inlet higher than the outlet. Non-glass/non-ceramic material is output through the open outlet end of outer member utilizing a flow of separation fluid. The glass/ceramic material is output to the size reduction unit through the open inlet end of the outer member utilizing the rotating wound member of the glass separator unit.

31 Claims, 2 Drawing Sheets

(56) References Cited

U.S. PATENT DOCUMENTS

| | | |
|---|---|---|
| 6,488,762 B1 | 12/2002 | Shi |
| 6,699,321 B2 | 3/2004 | Pelot et al. |
| 6,743,287 B2 | 6/2004 | Sunde |
| 7,413,602 B2 | 8/2008 | Grasso, Jr. et al. |
| 7,700,017 B2 | 4/2010 | Mccarthy et al. |
| 7,771,529 B1 | 8/2010 | McPherson |
| 7,775,466 B2 | 8/2010 | Grasso, Jr. et al. |
| 7,931,220 B2 | 4/2011 | Grasso, Jr. et al. |
| 8,137,454 B2 | 3/2012 | Mcpherson |
| 8,236,230 B2 | 8/2012 | Mcpherson |
| 8,480,802 B2 | 7/2013 | Mcpherson |
| 9,856,171 B2 | 1/2018 | Tagnit-Hamou et al. |
| 10,087,105 B2 | 10/2018 | Calvin et al. |
| 10,315,954 B2 | 6/2019 | Pianaro et al. |
| 10,550,036 B2 | 2/2020 | Calvin et al. |
| 2003/0041783 A1 | 3/2003 | Monawar |
| 2003/0162885 A1 | 8/2003 | Kim |
| 2008/0308659 A1 | 12/2008 | Grasso, Jr. et al. |
| 2009/0283018 A1 | 11/2009 | Grasso, Jr. et al. |
| 2009/0286902 A1 | 11/2009 | Grasso, Jr. |
| 2011/0172075 A1 | 7/2011 | Grasso, Jr. et al. |
| 2017/0081249 A1 | 3/2017 | Gauci et al. |
| 2018/0104720 A1 | 4/2018 | Fricke et al. |
| 2019/0241992 A1 | 8/2019 | Fasolini et al. |
| 2019/0329268 A1 | 10/2019 | Valerio |

FIG. 1

RECYCLED GLASS POZZOLAN FOR CONCRETE

CROSS-REFERENCE TO RELATED APPLICATIONS

This application is a continuation of U.S. patent application Ser. No. 17/222,244 filed on Apr. 5, 2021, Now U.S. Pat. No. 11,760,690, which in turn claims the benefit of U.S. Patent Application No. 63/053,686 filed on Jul. 19, 2020, which are hereby incorporated by referenced in their entirety.

FIELD OF THE INVENTION

This invention relates generally to glass powder and, more particularly, to glass powder from post-consumer recycling; and still more particularly to glass powder from post-consumer recycling wherein the powder comprises a percentage of ceramic material; and even more particularly to a pozzolanic material comprising glass powder from post-consumer recycling wherein the powder comprises a percentage of ceramic material.

BACKGROUND OF THE INVENTION

Pozzolans are silicate-based materials that, in and of themselves, do not possess cementitious value. However, when a fine powder is reacted with calcium hydroxide in the presence of moisture, the resultant reaction forms cementitious compounds. A major source of pozzolanic material is fly ash from coal-fired power plants. However, as more and more coal-fired power plants are decommissioned in favor of greener technologies, the amount of fly ash available has decreased. As a result, there is a need for alternative sources of pozzolanic material.

One such alternative source is recycled consumer glass. Consumer glass is typically silicate-based boro- or aluminosilicate material making it an ideal source of pozzolanic material. One drawback, however, to using recycled glass is the presence of ceramic materials in the waste stream. Typically, pozzolan producers attempt to minimize the ceramic content of the starting material prior to grinding or crushing the material to form the fine powder of the pozzolan. Separation of the ceramic materials increases the production time which increases production costs.

Therefore, it would be desirable to have a system and method for producing a sustainable pozzolan for concrete made from recycled glass with a relativity high amount of ceramic material, thus lowering the cost of manufacturing the pozzolan and increasing the amount of material that gets reused.

BRIEF SUMMARY OF THE INVENTION

In accordance with the present invention, a sustainable pozzolan for concrete may be made from recycled glass taken from recycling facilities that is otherwise destined for the landfill. The pozzolan may replace up to 50 percent of Portland cement in concrete. Portland cement is the economically and environmentally intensive part of concrete. The pozzolan materials prepared in accordance with an embodiment of the present invention will enable concrete manufacturers to reduce their environmental impact by significantly reducing their $CO_2$ contributions while also diverting glass material that would otherwise go to the landfill, all at less cost.

In accordance with an aspect of the present invention, one exemplary embodiment may be directed towards a glass separator configured to receive consumer waste therein and comprising a tubular outer member having an inner surface and an outer surface defining an open inlet end and an open outlet end. The tubular outer member defines a first longitudinal axis. An inner helical member extends inwardly from the inner surface of the tubular outer member. The inner helical member defines an open central bore extending a length of the tubular outer member from the open inlet end to the open outlet end. The inner helical member defines a second longitudinal axis. The longitudinal axes are coaxial and are configured to be disposed at an angle relative to a horizontal reference plane wherein the open inlet end is arranged vertically higher than the open outlet end.

In one aspect, a width of the inner helical member may be less than one half of a diameter of the tubular outer member, and may be less than one quarter of the diameter of the tubular outer member, and may be still less than one tenth of the diameter of the tubular outer member. The glass separator unit may further include a conveyance having a first end configured to receive the consumer waste and a second end disposed within the open central bore and configured to deposit the consumer waste within the tubular outer member. The conveyance may extend within the open central bore approximately one half the length of the tubular outer member while the consumer waste may comprise one or more of nonmetal consumer waste, material recovery facility (MRF) waste, construction and demolition (C&D) waste, and automobile recycling waste.

In accordance with a further aspect, an apparatus for producing pozzolanic material from consumer waste may comprise a glass separator unit configured to remove glass material from the waste. The glass separator unit may comprise a tubular outer member having an inner surface and an outer surface defining an open inlet end and an open outlet end. An inner helical member extends inwardly from the inner surface of the tubular outer member and defines an open central bore extending from the open inlet end to the open outlet end. The tubular outer member and the open central bore define respective coaxial longitudinal axes that are configured to be disposed at an angle relative to a horizontal reference plane. The open inlet end is arranged vertically higher than the open outlet end. A size reduction unit may be downstream the glass separator unit and is configured to produce the pozzolanic material.

In another aspect, the apparatus may further include a metal separator unit upstream the size reduction unit. The metal separator unit may be configured to remove ferrous and non-ferrous material from the consumer waste. The metal separator unit may include a revolving belt unit having a first end and a second end. The revolving belt unit is configured to receive the consumer waste and has a conveyor belt mounted onto a first roller at a first end of the conveyor belt and onto a second roller at a second end of the conveyor belt. The second roller includes a magnetic eddy diffusion roller revolving eccentrically within an outer roller. An overhead magnetic separator having a revolving belt and a magnet is located above the revolving belt unit. The overhead magnetic separator is configured to attract ferrous material within the consumer waste disposed on the revolving belt unit using the magnet such that the ferrous material is removed from the consumer waste and deposited within a first collection bin. The magnetic eddy diffusion roller is configured to eject non-ferrous metal from the consumer waste disposed on the revolving belt unit such that the non-ferrous metal is deposited in the first collection bin or a second collection bin. The resultant nonmetal consumer waste may then be delivered to the glass separator unit.

In another aspect, the apparatus may further include a drying unit disposed downstream the glass separator unit and upstream the size reduction unit. The drying unit may be a rotary drum dryer or a fluidized bed dryer. Still further, the apparatus may also include a size classification unit downstream the size reduction unit. Material smaller than a preselected size may be withdrawn from the size classification unit as the pozzolanic material while material larger than the pre-selected size is returned to the size reduction unit for further processing.

In accordance with the present invention, another aspect is directed to a method of producing pozzolanic material from nonmetal consumer waste where the nonmetal consumer waste includes glass/ceramic material having a first density and non-glass/non-ceramic material having a second density that is less than the first density. The method may comprise providing a glass separator unit having a tubular outer member and an inner helical member; providing a conveyance having a first end and a second end where the second end of the conveyance is disposed within an open central bore of the glass separator unit; rotating the glass separator unit; injecting a fluid into the inlet end of the tubular outer member; inputting consumer waste onto the first end of the conveyance; outputting non-glass/non-ceramic material through the outlet end of the tubular outer member using the flow of the fluid; outputting glass/ceramic through the inlet end of the outer tubular member utilizing the rotation of the inner helical member; and reducing a particle size of the outputted glass/ceramic material.

In a further aspect, the method may further include drying the outputted glass/ceramic material prior to the reducing step. The step of reducing the particle size of the outputted glass/ceramic may be performed by a ball mill. The method may also include the further steps of providing a classification unit that is configured for classifying the powder into one or more particle sizes. When the powder is classified as a first particle size which is greater than a predetermined particle size, the powder is once again reprocessed for a further reduction in size. When the powder is classified as a second particle size which is smaller than the predetermined particle size, the powder is designated as the pozzolanic material.

In yet another aspect, a glass separator unit configured to receive waste therein is provided. The glass separator unit comprises an outer member and a wound member. The outer member defines an open inlet end configured to receive a separation fluid therein and an open outlet end, wherein the outer member defines a first longitudinal axis. The wound member is positioned within the outer member and defines an open central bore extending a length of the outer member along the first longitudinal axis, wherein the wound member defines a second longitudinal axis. The first and second longitudinal axes extend on a common plane and are configured to be disposed at an angle relative to a horizontal reference plane. The open inlet end is arranged vertically higher than the open outlet end, such that when loaded with the waste, a first portion of the waste having a density less than the separation fluid exits the glass separator through the open outlet end and a second portion of the waste having a density greater than the separation fluid exits the glass separator through the open inlet end.

In another aspect, an apparatus for producing pozzolanic material from consumer waste is provided. The apparatus comprises a glass separator unit and a size reduction unit. The glass separator unit is configured to remove glass material from the waste. The glass separator unit comprises an outer member defining an open inlet end configured to receive a separation fluid therein and an open outlet end, wherein the outer member defines a first longitudinal axis. The glass separator unit further includes a wound member positioned within the outer member. The wound member defines an open central bore extending along the first longitudinal axis, wherein the wound member defines a second longitudinal axis. The first and second longitudinal axes extend on a common plane and are configured to be disposed at an angle relative to a horizontal reference plane. The open inlet end is arranged vertically higher than the open outlet end, such that when loaded with the waste, a first portion of the waste having a density less than the separation fluid exits the glass separator through the open outlet end and a second portion of the waste having a density greater than the separation fluid exits the glass separator through the open inlet end. The size reduction unit is disposed downstream of the glass separator unit and is configured to produce the pozzolanic material.

In a further aspect, a method of producing pozzolanic material from non-metal waste is provided, wherein the non-metal waste includes glass/ceramic material and non-glass/non-ceramic material, wherein the glass/ceramic material has a first density, and wherein said non-glass/non-ceramic material has a second density that is less than the first density. The method comprises: a) providing a glass separator unit comprising an outer member and a wound member, wherein the outer member defines an open inlet end and an open outlet end, wherein the outer member defines a first longitudinal axis, wherein the wound member is positioned within the outer member, wherein the wound member defines an open central bore extending a length of the outer member along the longitudinal axis, wherein the wound member defines a second longitudinal axis, wherein the first and second longitudinal axes extend on a common plane, wherein the first and second longitudinal axes are configured to be disposed at an angle relative to a horizontal reference plane, and wherein the open inlet end is arranged vertically higher than the open outlet end; b) providing a conveyance having a first end and a second end, wherein the second end of the conveyance is disposed within the open central bore of the wound member; rotating the glass separator unit about the coaxial first and second longitudinal axes; c) injecting a flow of fluid into the input the open inlet end of the outer member; d) inputting waste into the first end of the conveyance; e) outputting the non-glass/non-ceramic material through the open outlet end of the outer member utilizing the flow of fluid; f) outputting the glass/ceramic material through the open inlet end of the outer member utilizing the rotating wound member of the glass separator unit; and g) reducing a particle size of the outputted glass/ceramic material to produce a powder, wherein the powder includes the pozzolanic material.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

The accompanying drawings form a part of this specification and are to be read in conjunction therewith, wherein like reference numerals are employed to indicate like parts in the various views, and wherein.

DETAILED DESCRIPTION OF THE INVENTION

Figure 1:
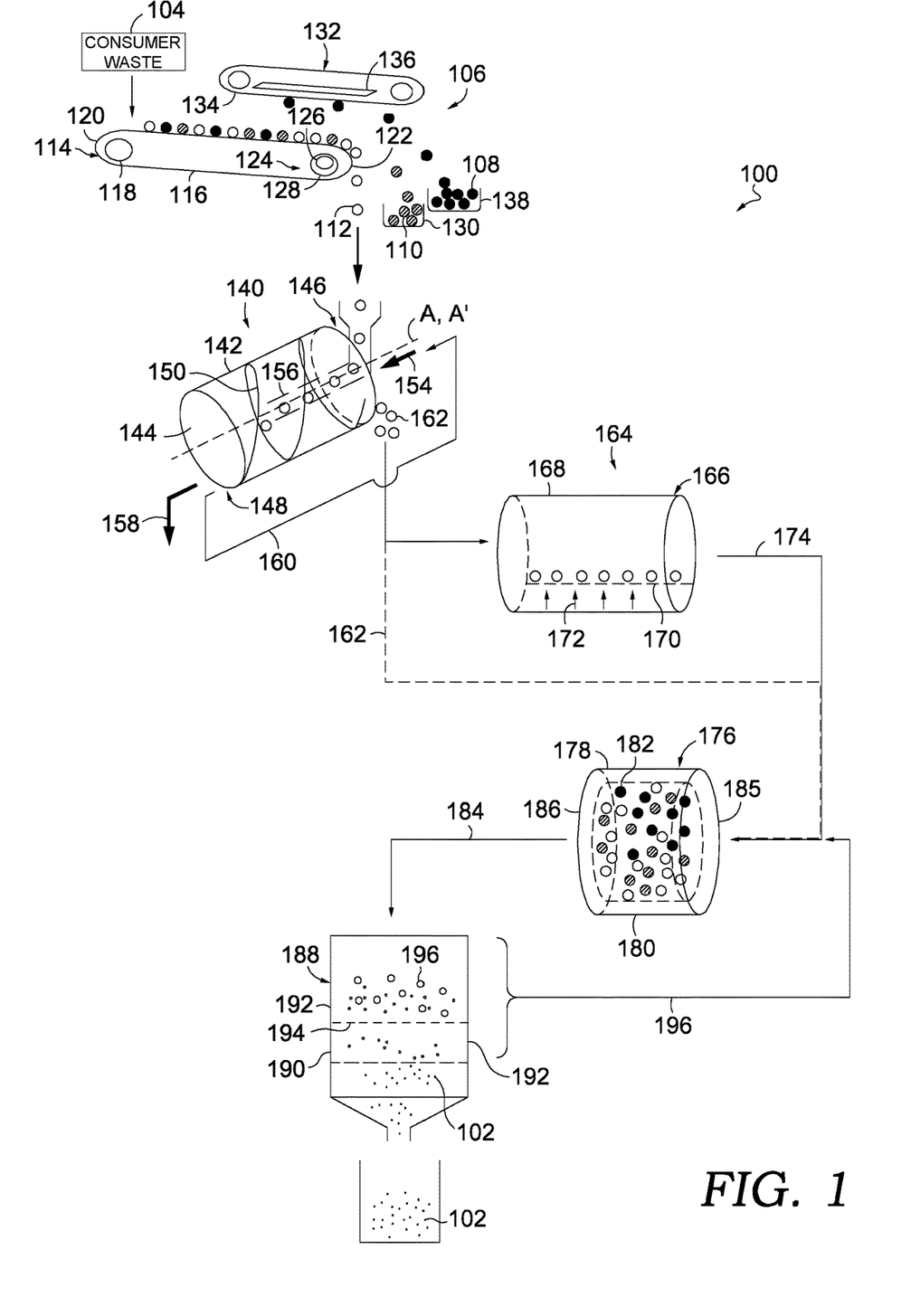
FIG. 1 is a schematic diagram of an exemplary embodiment of an apparatus for producing pozzolanic material from material recovery facility (MRF) waste in accordance with an aspect of the present invention.

With reference to FIG. 1, an exemplary apparatus 100 configured to produce pozzolanic material 102 from consumer waste 104 in accordance with the present invention is shown. Consumer waste may refer to any pre- or post-consumer waste materials. Non-limiting examples of suitable waste streams include material recovery facility (MRF) waste, construction and demolition (C&D) waste, and automobile recycling waste such as automotive scrap residue (ASR). Initially, consumer waste 104 may be optionally charged into a metal separator unit 106 which may separate ferrous metal 108 and non-ferrous metal 110 from nonmetal waste 112.

By way of example and without limitation thereto, metal separator unit 106 may include a revolving belt unit 114 having a conveyor belt 116 mounted onto a first roller 118 at first end 120 whereby consumer waste 104 is deposited proximate first end 120. Consumer waste 104 may then travel along conveyor belt 116 to second end 122 which includes a second roller 124. In accordance with one aspect of the present invention, second roller 124 may include a magnetic eddy diffusion roller 126 therein which revolves eccentrically to outer roller 128. Metal separator unit 106 may also include a magnetic separator 132 having a revolving belt 134 and magnet 136 mounted above conveyor belt 116. As consumer waste 104 travels from first end 120 to second end 122, ferrous metal 108 is attracted to magnet 136 and is held above conveyor belt 116 on revolving belt 134. Ferrous metal 108 then travels on revolving belt 134 until ferrous metal 108 is released from magnet 136 and deposited within a collection bin 138. Eccentric revolution of eddy diffusion roller 126 also causes non-ferrous metal 110 to be ejected from consumer waste 104. Nonmetal waste 112 may then fall off of second end 122 whereby nonmetal waste 112 may undergo further processing as described below. Thus, by having a magnetic separator in addition to the eddy diffusion roller, two different metal material streams may be produced-one being ferrous metal and the other being non-ferrous metal.

Following metal separation within metal separator unit 106, nonmetal waste 112 (or consumer waste 104 should metal separator unit 106 be omitted) passes to glass/ceramic separator unit 140 (hereinafter, glass separator unit 140). With additional reference to FIGS. 2 and 3, glass separator unit 140 has a tubular outer member 142 having an outer surface 143 and an inner surface 144, open inlet end 146 and open outlet end 148. Inner helical member 150 is fixedly coupled to tubular outer member 142 and extends inwardly from inner surface 144. In accordance with an aspect of the present invention the width W of helical member 150 is less than about one-half of the diameter D of tubular outer member 142, and more specifically is less than about one-quarter of diameter D, and still more specifically is about one-tenth of diameter D, so as to define an open central bore 152. Width W may be the same throughout the length of helical member 150 or may be of differing dimensions along the length, and in one instance may smoothly taper from its smallest width at open inlet end 146 to its largest width at open outlet end 148 or vice versa. Helical member 150 may also have any desired pitch, and in accordance with one aspect of the present invention, pitch P is selected such that helical member 150 completes 1 to 3 turns between open inlet end 146 and open outlet end 148.

Figures 2, 3:
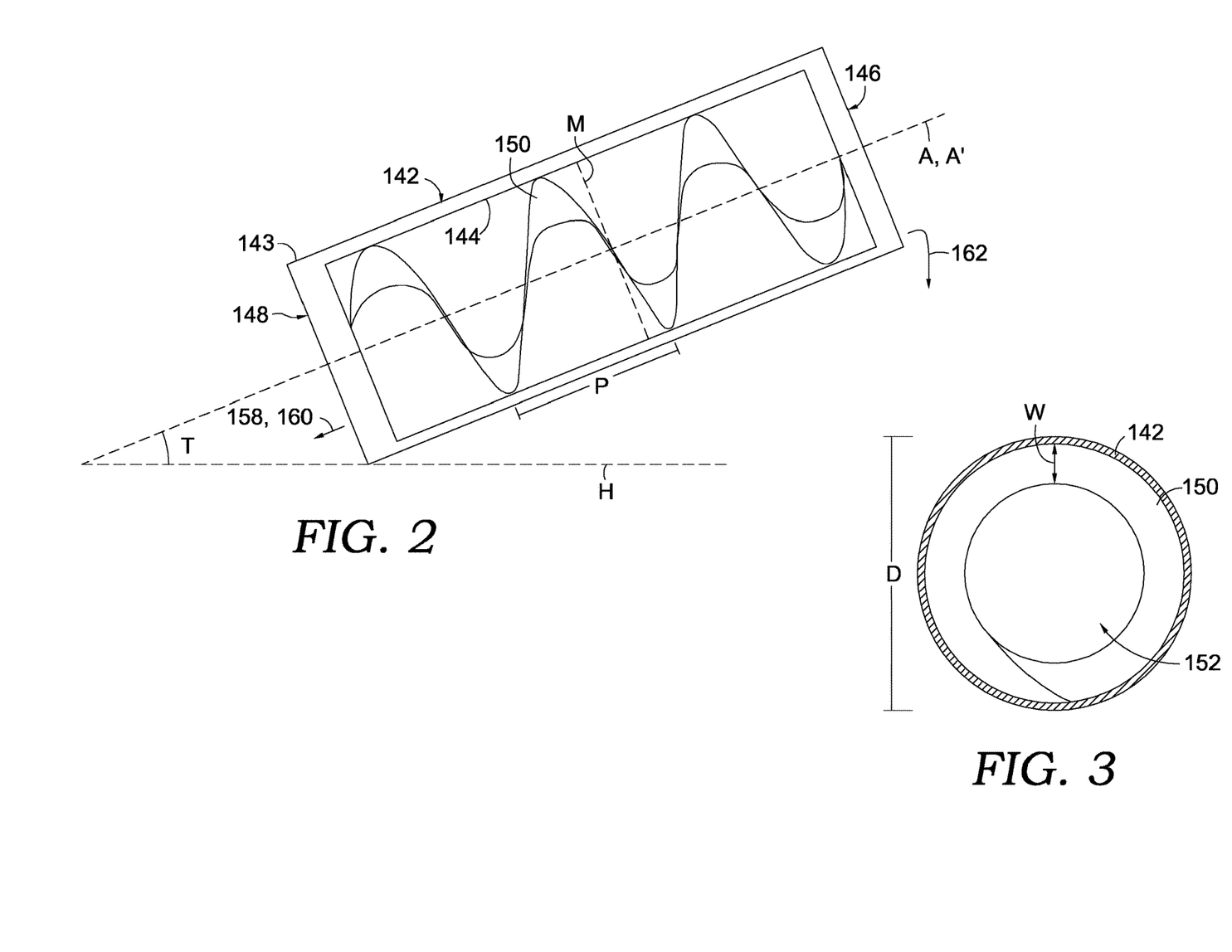
FIG. 2 is a diagrammatic view of an exemplary embodiment of a consumer waste separator suitable for use within the exemplary apparatus shown in FIG. 1.
FIG. 3 is an end view of the exemplary embodiment of a consumer waste separator shown in FIG. 2.

Tubular outer member 142 and open central bore 152 define respective coaxial longitudinal axes A, A'. In one aspect of the present invention, longitudinal axes A, A' are disposed at an angle T relative to a horizontal reference plane H. Angle T may be any suitable angle between about 1° and 45°, and is more specifically between about 5° and 20°, and still more specifically between about 10° and 15°. Open inlet end 146 is arranged vertically higher than open outlet end 148.

During use, glass separator unit 140 is rotated about longitudinal axes A, A' while a high-volume flow of fluid, such as water 154, is injected or inputted into open inlet end 146. While any suitable fluid may be used within glass separator unit 140, the following discussion will be directed toward the use of water 154. In one non-limiting example, the flow rate of water 154 may be between about 30-40 gallons per minute (GPM), although it should be understood that any desired flow rate may be used and may be adjusted to account for glass separator units having different diameters and/or lengths. Similarly, the speed of rotation of glass separator unit 140 may be varied depending upon the dimensions of the unit, but in one non-limiting example, the speed of rotation is selected to about 15 rotations per minute (RPM).

As shown in FIG. 1, nonmetal waste 112 may be deposited into glass separator unit 140 using a chute, tube or other similar conveyance 156. In one aspect of the invention, conveyance 156 is configured to extend approximately half way along the length of glass separator unit 140 such that nonmetal waste 112 is deposited proximate midpoint M along length L of tubular outer member 142. Dense matter, such as glass and ceramics, will sink within the flow of water 154 to rest upon inner surface 144 of tubular outer member 142 while less dense material, such as plastic, paper, cardboard and the like, will float or remain suspended within water 154 and pass down open central bore 152 to exit glass separator unit 140 through open bottom end 148. The paper/plastic waste 158 may then be screened, filtered and/or pressed for further processing while the extracted water 160 may be recirculated. The glass and ceramic material 160 will engage with helical member 150 and be lifted out of glass separator unit 140 through open inlet end 146 as the unit rotates. Glass and ceramic material 162 may then be collected for further processing, as will be discussed below in greater detail.

While not limiting the present invention solely thereto, it has been found that positioning conveyance 156 proximate midline M facilitates separation of glass and ceramic material 162 while minimizing loss of uncaptured glass and ceramic material in the discharged paper/plastic waste 158 (which may result when conveyance 156 is positioned proximate outlet end 148) and minimizing unwanted escape of paper or plastic materials through open inlet end 146 along with glass and ceramic material 162 (which may result when conveyance 156 is positioned proximate inlet end 146).

It should be further noted by those skilled in the art that while any suitable helical member may be used, the width of helical member 150, along with the angle of tubular outer member 142 may be adjusted to maximize separation efficiencies while minimizing water waste. By way of example and without limitation thereto, width W of helical member 150 may be selected to be less then diameter D of tubular outer member 142 such that helical member does not entirely occlude or obstruct open central bore 152 when viewed from the end (see FIG. 3). Rather, width W may be selected to extend across only a fraction of diameter D, and in one embodiment the maximum width W of helical member 150 is about one-tenth of diameter D.

Without being tied to any specific theory, limiting width W provides for a number of benefits. First, maintaining an open central bore 152 without obstruction creates a zone of laminar flow of water flow 154 along the length of tubular outer member 142. Laminar flow may assist separating paper/plastic waste 158 from glass and ceramic material 162 while directing paper/plastic waste 158 out of open outlet end 148. That is, paper/plastic waste 158 is less likely to engage with helical member 150 thereby increasing separation efficiencies.

Second, helical member 150 may act like an Archimedean water screw such that water within tubular outer member 142 may be ejected out open inlet end 146. However, by limiting the width of helical member 150 (the screw), the amount of water entrained upon the screw may be minimized. The presence of glass and ceramic material 162 on helical member 150 may further reduce the amount of water that may travel along the screw. Coupled with the limited width W, selection of angle T may also improve efficiencies. That is, if angle T is too great (i.e., in one extreme approaching) 90°, glass and ceramic material 162 may simply fall through tubular outer member 142 and pass through open outlet end 148 along with paper/plastic waste 158. Conversely, if angle T is too shallow (i.e., approaching) 0°, helical member 150 may be able to pump water out of open inlet end 146. Thus, width W and angle T may be individually and/or collectively optimized for each respective system 100.

With continued reference to FIG. 1, after exiting open inlet end 146 of tubular outer member 142, glass and ceramic material 162 may optionally be delivered to drying unit 164 wherein the moisture content within glass and ceramic material 162 is reduced, preferably to less than 10% water, and still more preferably to less than about 3% water. Drying unit 164 may utilize any common means, such as air flow, heat or fluidized bed techniques. By way of example and without limitation thereto, drying unit 164 may be a rotary drum dryer or a fluidized bed dryer.

In the exemplary embodiment shown in FIG. 1, drying unit 164 comprises a fluidized bed dryer 166 having a dryer housing 168 and perforated bed 170. Wet glass and ceramic material 162 is loaded into dryer housing 168 while hot, dry air 172 is then injected into dryer housing 168 beneath perforated bed 170 such that the dry air 172 passes through and lifts glass and ceramic material 162 (i.e., the solid materials becomes fluidized in the gas). Passing of the hot gas through the material causes glass and ceramic material 162 to dry, at which point the dry glass and ceramic material 174 exits dryer unit 164 and is directed to size reduction unit 176. While optional, drying unit provides a number of advantages, such as reducing the weight of material entering the size reduction unit 176, reducing clumping of product within size reduction unit 176 while also easing classification of the ultimate pozzolanic material, as will be described in greater detail below.

Apparatus 100 may further include size reduction unit 176 which is configured to crush, grind, pulverize or otherwise reduce the particle size of glass and ceramic material 162 (or dry glass and ceramic material 174) to that of the desired dimensions of the final pozzolanic material product 102. While any suitable size reduction instrument may be used, in accordance with an aspect of the present invention, size reduction unit 176 is a mill, such as a ball mill, roller mill or hammer mill. As shown in the exemplary embodiment in FIG. 1, size reduction unit 176 is a ball mill 178 including a mill housing 180 within which resides the size reduction media, typically steel balls 182. Glass and ceramic material 162, 174 is introduced through inlet end 185 into mill housing 180. Rotation of mill housing 180 causes kinetic collisions between balls 182 and glass and ceramic material 162, 174. Repeated collisions ultimately results in glass and ceramic material 162, 174 becoming reduced to a fine powder 184 which is discharged through outlet end 186. In accordance with an aspect of the present invention, fine powder 184 may comprise final pozzolanic material product 102.

In accordance with a further aspect of the present invention, fine powder 184 discharged through outlet end 186 may be optionally introduced to a size classification unit 188. By way of example and without limitation thereto, size classification unit 188 may be an air classifier, sieve assembly or other suitable device. The exemplary embodiment shown in FIG. 1 includes a sieve assembly 190 as the size classification unit 188. Sieve assembly 190 may include at least one sieve deck 192 including a screen 194 therein whereby fine powder 184 is passed therethrough. Screen 194 is configured to include a user preselected mesh size such that particles smaller than the preselected mesh size pass though screen 194 and are collected as the final pozzolanic material product 102 while particles 196 that are larger than the preselected mesh size fail to pass through screen 194. Large particles 196 may then be recycled to size reduction unit 176 for additional processing. In accordance with an aspect of the present invention, the preselected mesh size is about 35 micron.

It should be further noted that additional sieve decks may be used, wherein sequential decks include serially smaller mesh sizes with the final (lowest) sieve deck including screen 194 having the preselected mesh size as described above. Multiple sieve decks with decreasing mesh sizes may assist in preventing clogging of any one sieve deck. It should also be noted that sieve assembly 190 may further include a vibration source such that sieve deck(s) 192 may be shaken so as to assist in filtering fine powder 184 through the deck screen(s).

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting,

What is claimed is:

1. A glass separator unit configured to receive waste therein, the glass separator unit comprising:

an outer member defining an open inlet end configured to receive a separation fluid therein and an open outlet end, and wherein said outer member defines a first longitudinal axis; and a wound member positioned within said outer member, wherein said wound member defines an open central bore extending a length of said outer member along said first longitudinal axis, wherein said wound member defines a second longitudinal axis, wherein said first and second longitudinal axes extend on a common plane, wherein said first and second longitudinal axes are configured to be disposed at an angle relative to a horizontal reference plane, and wherein said open inlet end is arranged vertically higher than said open outlet end, such that when loaded with said waste, a first portion of said waste having a density less than said separation fluid exits said glass separator through said open outlet end and a second portion of said waste having a density greater than said separation fluid exits said glass separator through said open inlet end.

2. The glass separator unit of claim 1 wherein a width of said wound member is less than one half of a diameter of said outer member.

3. The glass separator unit of claim 2 wherein said width of said wound member is less than one quarter of said diameter of said outer member.

4. The glass separator unit of claim 3 wherein said width of said wound member is less than one tenth of said diameter of said outer member.

5. The glass separator unit of claim 1 further comprising a conveyance having a first end and a second end, wherein said first end of said conveyance is configured to receive the waste, wherein said second end of said conveyance is disposed within said open central bore of said wound member, and wherein said second end of said conveyance is configured to deposit the waste within said outer member.

6. The glass separator unit of claim 5 wherein said conveyance extends within said open central bore of said wound member approximately one half said length of said outer member.

7. The glass separator unit of claim 1 wherein the waste comprises one or more of material recovery facility (MRF) waste, construction and demolition (C&D) waste, and automobile recycling waste.

8. The glass separator unit of claim 1 wherein the waste is nonmetal waste.

9. The glass separator unit of claim 1 wherein said first and second longitudinal axes are coaxial.

10. An apparatus for producing pozzolanic material from consumer waste comprising:
a) a glass separator unit configured to remove glass material from the waste, wherein said glass separator unit comprises:
i) an outer member defining an open inlet end configured to receive a separation fluid therein and an open outlet end, and wherein said outer member defines a first longitudinal axis; and
ii) a wound member positioned within said outer member, wherein said wound member defines an open central bore extending along said first longitudinal axis, wherein said wound member defines a second longitudinal axis, wherein said first and second longitudinal axes extend on a common plane, wherein said first and second longitudinal axes are configured to be disposed at an angle relative to a horizontal reference plane, and wherein said open inlet end is arranged vertically higher than said open outlet end, such that when loaded with said waste, a first portion of said waste having a density less than said separation fluid exits said glass separator through said open outlet end and a second portion of said waste having a density greater than said separation fluid exits said glass separator through said open inlet end; and b) a size reduction unit downstream said glass separator unit configured to produce the pozzolanic material.

11. The apparatus of claim 10 further comprising a metal separator unit upstream said size reduction unit, wherein said metal separator unit is configured to remove ferrous and non-ferrous metal material from the waste.

12. The apparatus of claim 11 wherein said metal separator unit comprises:
a revolving belt unit configured to receive the waste and having a conveyor belt having a first end and a second end, wherein said conveyor belt unit is mounted onto a first roller at said first end of said conveyor belt, wherein said revolving belt unit is mounted onto a second roller at said second end of said conveyor belt, wherein said second roller includes a magnetic eddy diffusion roller revolving eccentrically within an outer roller; and
an overhead magnetic separator having a revolving belt and a magnet, wherein said overhead magnetic separator is located above said revolving belt unit,
wherein said overhead magnetic separator is configured to attract ferrous metal material within the waste disposed on said revolving belt unit using said magnet, wherein the ferrous material is removed from the waste and deposited within a first collection bin, and
wherein said magnetic eddy diffusion roller is configured to eject non-ferrous metal material from the waste disposed on said revolving belt unit, wherein said non-ferrous metal material is deposited in the first collection bin or a second collection bin, and
wherein resultant nonmetal waste disposed on said revolving belt unit is delivered to said glass separator unit.

13. The apparatus of claim 10 further comprising a drying unit disposed downstream of said glass separator unit.

14. The apparatus of claim 13 wherein said drying unit is disposed upstream of said size reduction unit.

15. The apparatus of claim 13 wherein said drying unit comprises a rotary drum dryer or a fluidized bed dryer.

16. The apparatus of claim 10 further comprising a size classification unit disposed downstream of said size reduction unit, wherein material smaller than a preselected size is withdrawn from said size classification unit, and wherein material larger than said pre-selected size is returned to said size reduction unit.

17. The apparatus of claim 16 wherein further comprising:
a metal separator unit disposed upstream of said size reduction unit, wherein said metal separator unit is configured to remove ferrous and non-ferrous metal material from the waste; and
a drying unit disposed downstream of said glass separator unit.

18. The apparatus of claim 10 wherein said first and second longitudinal axes are coaxial.

19. A method of producing pozzolanic material from non-metal waste, wherein the non-metal waste includes glass/ceramic material and non-glass/non-ceramic material, wherein the glass/ceramic material has a first density, wherein said non-glass/non-ceramic material has a second density that is less than the first density, the method comprising:
- providing a glass separator unit comprising an outer member and a wound member, wherein said outer member defines an open inlet end and an open outlet end, wherein said outer member defines a first longitudinal axis, wherein said wound member is positioned within said outer member, wherein said wound member defines an open central bore extending a length of said outer member along said longitudinal axis, wherein said wound member defines a second longitudinal axis, wherein said first and second longitudinal axes extend on a common plane, wherein said first and second longitudinal axes are coaxial, wherein said first and second longitudinal axes are configured to be disposed at an angle relative to a horizontal reference plane, and wherein said open inlet end is arranged vertically higher than said open outlet end;
- providing a conveyance having a first end and a second end, wherein said second end of said conveyance is disposed within said open central bore of said wound member;
- rotating said glass separator unit about said coaxial first and second longitudinal axes;
- injecting a flow of fluid into said open inlet end of said outer member;
- inputting waste into said first end of said conveyance;
- outputting the non-glass/non-ceramic material through said open outlet end of said outer member utilizing said flow of fluid;
- outputting the glass/ceramic material through said open inlet end of said outer member utilizing said rotating wound member of said glass separator unit; and
- reducing a particle size of said outputted glass/ceramic material to produce a powder, wherein said powder includes the pozzolanic material.

20. The method of claim 19 further comprises the step of drying said outputted glass/ceramic material prior to the step of reducing said particle size of said outputted glass/ceramic material.

21. The method of claim 19 wherein the step of reducing said particle size of said outputted glass/ceramic material is performed by a ball mill.

22. The method of claim 19 further comprising the steps of:
- providing a classification unit that is configured for classifying said powder into one or more particle sizes,
- wherein when said powder is classified as a first particle size that is greater than a predetermined particle size, said powder is once again reprocessed for a further reduction in size, and
- wherein when said powder is classified as a second particle size that is less than said predetermined particle size, said powder is designated as the pozzolanic material.

23. A glass separator unit configured to receive consumer waste therein, the glass separator unit comprising:
- a tubular outer member having an inner surface and an outer surface, wherein said tubular outer member defines an open inlet end and an open outlet end, and wherein said tubular outer member defines a first longitudinal axis and a diameter;
- an inner helical member extending inwardly from said inner surface of said tubular outer member, wherein said inner helical member defines an open central bore extending a length of said tubular outer member from said open inlet end to said open outlet end, wherein said inner helical member defines a second longitudinal axis, and wherein a width of said inner helical member is less than one quarter of said diameter of said tubular outer member; and
- a conveyance having a first end and a second end, wherein said first end of said conveyance is configured to receive the consumer waste, wherein said second end of said conveyance is disposed within said open central bore of said inner helical member, and wherein said second end of said conveyance is configured to deposit the consumer waste within said tubular outer member,
- wherein said first and second longitudinal axes are coaxial, wherein said first and second longitudinal axes are configured to be disposed at an angle relative to a horizontal reference plane, and wherein said open inlet end is arranged vertically higher than said open outlet end, and
- wherein said conveyance extends within said open central bore of said inner helical member approximately one half said length of said tubular outer member.

24. The glass separator unit of claim 23 wherein said width of said inner helical member is less than one tenth of said diameter of said tubular outer member.

25. The glass separator unit of claim 23 wherein the consumer waste comprises one or more of material recovery facility (MRF) waste, construction and demolition (C&D) waste, and automobile recycling waste.

26. The glass separator unit of claim 23 wherein the consumer waste is nonmetal consumer waste.

27. An apparatus for producing pozzolanic material from consumer waste comprising:
- a) a glass separator unit configured to remove glass material from the consumer waste, wherein said glass separator unit comprises:
  - i) a tubular outer member having an inner surface and an outer surface, wherein said tubular outer member defines an open inlet end and an open outlet end, and wherein said tubular outer member defines a first longitudinal axis; and
  - ii) an inner helical member extending inwardly from said inner surface of said tubular outer member, wherein said inner helical member defines an open central bore extending from said open inlet end to said open outlet end, wherein said inner helical member defines a second longitudinal axis, wherein said first and second longitudinal axes are coaxial, wherein said first and second longitudinal axes are configured to be disposed at an angle relative to a horizontal reference plane, and wherein said open inlet end is arranged vertically higher than said open outlet end;
- b) a drying unit disposed downstream of said glass separator unit;
- c) a size reduction unit downstream said glass separator unit configured to produce the pozzolanic material; and
- d) a metal separator unit upstream said size reduction unit, wherein said metal separator unit is configured to remove ferrous and non-ferrous metal material from the consumer waste, wherein metal separator unit comprises:
  - i) a revolving belt unit configured to receive the consumer waste and having a conveyor belt having a first end and a second end, wherein said conveyor belt unit is mounted onto a first roller at said first end of said conveyor belt, wherein said revolving belt unit is mounted onto a second roller at said second end of said conveyor belt, wherein said second roller includes a magnetic eddy diffusion roller revolving eccentrically within an outer roller; and ii) an overhead magnetic separator having a revolving belt and a magnet, wherein said overhead magnetic separator is located above said revolving belt unit, wherein said overhead magnetic separator is configured to attract ferrous metal material within the consumer waste disposed on said revolving belt unit using said magnet, wherein the ferrous material is removed from the consumer waste and deposited within a first collection bin, and wherein said magnetic eddy diffusion roller is configured to eject non-ferrous metal material from the consumer waste disposed on said revolving belt unit, wherein said non-ferrous metal material is deposited in the first collection bin or a second collection bin, and wherein resultant nonmetal consumer waste disposed on said revolving belt unit is delivered to said glass separator unit.

28. The apparatus of claim 27 wherein said drying unit is disposed upstream of said size reduction unit.

29. The apparatus of claim 27 wherein said drying unit comprises a rotary drum dryer or a fluidized bed dryer.

30. An apparatus for producing pozzolanic material from consumer waste comprising:
a) a glass separator unit configured to remove glass material from the consumer waste, wherein said glass separator unit comprises:
i) a tubular outer member having an inner surface and an outer surface, wherein said tubular outer member defines an open inlet end and an open outlet end, and wherein said tubular outer member defines a first longitudinal axis; and
ii) an inner helical member extending inwardly from said inner surface of said tubular outer member, wherein said inner helical member defines an open central bore extending from said open inlet end to said open outlet end, wherein said inner helical member defines a second longitudinal axis, wherein said first and second longitudinal axes are coaxial, wherein said first and second longitudinal axes are configured to be disposed at an angle relative to a horizontal reference plane, and wherein said open inlet end is arranged vertically higher than said open outlet end;

b) a size reduction unit downstream said glass separator unit configured to produce the pozzolanic material;
c) a size classification unit disposed downstream of said size reduction unit, wherein material smaller than a preselected size is withdrawn from said size classification unit, and wherein material larger than said pre-selected size is returned to said size reduction unit; and
d) a metal separator unit upstream said size reduction unit, wherein said metal separator unit is configured to remove ferrous and non-ferrous metal material from the consumer waste, wherein metal separator unit comprises:
i) a revolving belt unit configured to receive the consumer waste and having a conveyor belt having a first end and a second end, wherein said conveyor belt unit is mounted onto a first roller at said first end of said conveyor belt, wherein said revolving belt unit is mounted onto a second roller at said second end of said conveyor belt, wherein said second roller includes a magnetic eddy diffusion roller revolving eccentrically within an outer roller; and
ii) an overhead magnetic separator having a revolving belt and a magnet, wherein said overhead magnetic separator is located above said revolving belt unit, wherein said overhead magnetic separator is configured to attract ferrous metal material within the consumer waste disposed on said revolving belt unit using said magnet, wherein the ferrous material is removed from the consumer waste and deposited within a first collection bin, and wherein said magnetic eddy diffusion roller is configured to eject non-ferrous metal material from the consumer waste disposed on said revolving belt unit, wherein said non-ferrous metal material is deposited in the first collection bin or a second collection bin, and wherein resultant nonmetal consumer waste disposed on said revolving belt unit is delivered to said glass separator unit.

31. The apparatus of claim 30 wherein further comprising:
a metal separator unit disposed upstream of said size reduction unit, wherein said metal separator unit is configured to remove ferrous and non-ferrous metal material from the consumer waste; and
a drying unit disposed downstream of said glass separator unit.

* * * * *